United States Patent
Becht et al.

(10) Patent No.: US 10,634,787 B2
(45) Date of Patent: Apr. 28, 2020

(54) LASER DISTANCE MEASURING DEVICE AND METHOD FOR OPERATING A LASER DISTANCE MEASURING DEVICE

(71) Applicant: HENSOLDT Optronics GmbH, Oberkochen (DE)

(72) Inventors: Hubert Becht, Wilfingen (DE); Martin Haug, Gerstetten (DE); Markus Rech, Nattheim (DE); Martin Weispfenning, Sinsheim-Duehren (DE)

(73) Assignee: Hensoldt Optronics GmbH, Oberkochen (DE)

( * ) Notice: Subject to any disclaimer, the term of this patent is extended or adjusted under 35 U.S.C. 154(b) by 313 days.

(21) Appl. No.: 15/672,615

(22) Filed: Aug. 9, 2017

(65) Prior Publication Data
US 2018/0246211 A1    Aug. 30, 2018

(30) Foreign Application Priority Data
Aug. 11, 2016    (DE) .................. 10 2016 114 909

(51) Int. Cl.
| | |
|---|---|
| *G01C 3/08* | (2006.01) |
| *G01S 17/10* | (2020.01) |
| *G01S 7/484* | (2006.01) |
| *G01S 7/486* | (2020.01) |
| *G01S 7/481* | (2006.01) |
| *G01S 7/4861* | (2020.01) |

(52) U.S. Cl.
CPC .............. *G01S 17/10* (2013.01); *G01S 7/481* (2013.01); *G01S 7/484* (2013.01); *G01S 7/4815* (2013.01); *G01S 7/4861* (2013.01); *G01S 7/4868* (2013.01)

(58) Field of Classification Search
CPC ...... G01S 7/481; G01S 7/4861; G01S 7/4868; G01S 7/4815; G01S 7/484; G01S 17/10
USPC ........................................... 356/4.01
See application file for complete search history.

(56) References Cited

U.S. PATENT DOCUMENTS

| | | | | | |
|---|---|---|---|---|---|
| 3,830,567 | A | * | 8/1974 | Riegl ................ | G01S 7/282 356/5.05 |
| 3,848,999 | A | * | 11/1974 | Dall'Armi ........... | G01S 17/105 356/5.04 |
| 4,657,382 | A | * | 4/1987 | Busujima .............. | G01S 7/484 356/5.08 |

FOREIGN PATENT DOCUMENTS

| | | |
|---|---|---|
| DE | 10215109 A1 | 10/2003 |
| DE | 102008056953 B3 | 5/2010 |

* cited by examiner

*Primary Examiner* — Mark Hellner
(74) *Attorney, Agent, or Firm* — Neugeboren O'Dowd PC

(57) ABSTRACT

A laser distance measuring device for determining a distance to a target, in particular for a weapon system, comprises a first laser light source that is designed to emit laser pulses with a first pulse power, a second laser light source that is designed to emit laser pulses with a second pulse power, wherein the second pulse power of the second laser light source is higher than the first pulse power of the first laser light source (TX1), a receiver that is designed for receiving laser pulse radiation (RP) reflected by the target, an electronic controller for actuating the first laser light source, the second laser light source and the receiver. The electronic controller is designed to emit a first laser pulse by means of the first laser light source, after which, if a distance to the target cannot be determined with the first laser pulse by means of the receiver, a second laser pulse is emitted by means of the second laser light source.

15 Claims, 1 Drawing Sheet

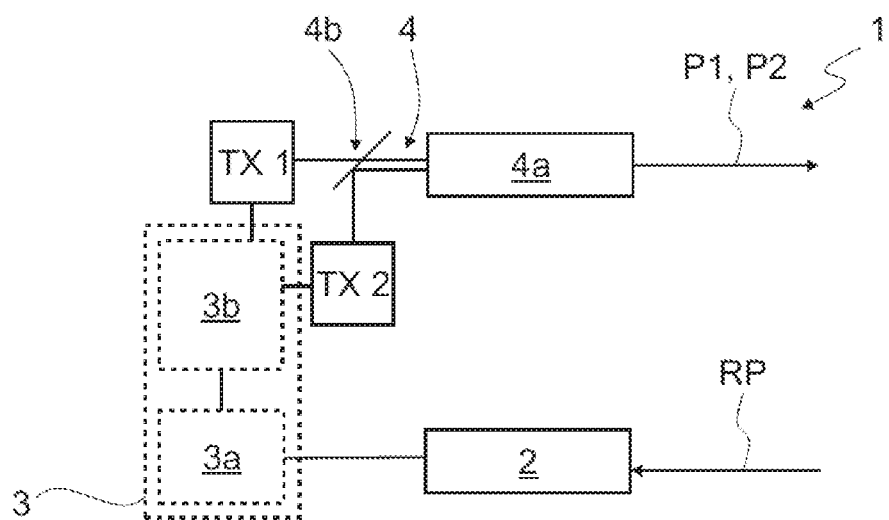

LASER DISTANCE MEASURING DEVICE AND METHOD FOR OPERATING A LASER DISTANCE MEASURING DEVICE

PRIORITY

This application claims priority under 35 U.S.C. § 119 to German Patent Application No. 10 2016 114 909.8 filed on Aug. 11, 2016, the details of which are incorporated into the present application by reference and for all proper purposes.

FIELD OF THE INVENTION

The invention relates to a laser distance measuring device for determining a distance to a target. The invention also concerns a method for operating such a laser distance measuring device.

BACKGROUND OF THE INVENTION

The determination of the distance between an observer and a target can, in particular in the case of weapon systems, be carried out by means of laser distance measuring devices. Laser distance measuring devices are based on the principle of measuring the transition time of an optical pulse from the observer to the target and back from the target to the observer. From the transition time of the optical pulse and the knowledge of the speed, the distance can be determined. The optical pulse or impulse is produced by a laser. Both diode lasers with low pulse power or pulse energy as well as a giant pulse laser with relatively high pulse power and pulse energy are used as a laser transmitter. In order to be able to achieve a sufficiently long range with the diode laser distance measuring devices, as a rule the lasers used are operated with a high pulse repetition rate and the backscattered energy of many laser pulses is added (so-called sampling principle). With giant pulse lasers, exactly one laser pulse is emitted and the backscattered radiation is detected with a receiver.

Giant pulse lasers are used in laser distance measuring devices to achieve long ranges of several kilometers. Depending on the transmission of the atmosphere and the particular reflective properties of the target, under favorable conditions ranges of more than 20 kilometers in distance can be achieved. However, if the laser beam of a giant pulse laser is incident on a highly reflective target at a short distance, the reflected pulse energy is so great that damage to the receiving diode or the receiver electronics can occur.

The invention disclosed in DE 102 15 109 B4 is based on the problem of designing a laser distance measuring device for a weapon system so that the receiver diode is not damaged by its own reflected radiation after aiming at a retroreflector. To solve said problem, a laser distance measuring device for a weapon system comprising a receiver diode, a device for switching on and off and a protective filter is proposed, in which the protective filter is switched on when a first reflected laser pulse is received, the device for switching on and off compares the energy of a reflected first laser pulse with a limit value and a second laser pulse is transmitted for distance measurement if the limit value is exceeded. However, considerable restrictions with the lasers that can be used arise through the protective filter that is used.

Based on this, it is the object of the present invention to provide a laser distance measuring device and a method for operating a laser distance measuring device of the aforementioned type that avoids the disadvantages of the prior art, in particular to ensure protection of the receiver against its own reflected radiation without limitations on the laser light source.

This object is achieved according to the invention by a laser distance measuring device and method with the features mentioned in the claims.

SUMMARY OF THE INVENTION

According to one aspect, a laser distance measuring device is proposed for determining a distance to a target, in particular for a weapon system, comprising a first laser light source that is designed to emit laser pulses with a first pulse power or pulse energy; a second laser light source that is designed to emit laser pulses with a second pulse power or pulse energy, wherein the second pulse power or pulse energy of the second laser light source is higher than the first pulse power or pulse energy of the first laser light source; a receiver that is designed to receive laser pulse radiation reflected by the target; and an electronic controller for controlling the first laser light source, the second laser light source and the receiver, wherein for determining the distance to the target the electronic controller is configured to emit a first laser pulse by means of the first laser light source, whereupon if a distance to the target cannot be determined with the first laser pulse by the receiver, a second laser pulse is emitted by the second laser light source.

Further embodiments and developments of the invention are revealed by the subordinate claims and in connection with the drawing figure.

BRIEF DESCRIPTION OF THE DRAWING FIGURES

FIG. 1 shows a schematic representation of a laser distance measuring device according to the invention.

DETAILED DESCRIPTION

With reference to the example shown in FIG. 1, the following detailed description is provided to describe and characterize aspects and embodiments of the invention.

To avoid damaging the receiver, according to the invention it is proposed to integrate a laser of low pulse power in addition to a laser with a high pulse power within a laser distance measuring device. The pulse power of the first laser with low pulse power is selected so that the radiation reflected back by highly reflective targets from a short distance does not cause damage to the receiver. For a distance measurement, initially a laser pulse of low pulse energy of the first laser is emitted. If a distance can already be determined with said laser pulse, the second laser is no longer ignited. The process of distance measurement is already completed in this case. If a distance cannot be determined with the first laser pulse of the first laser, it is assumed therefrom that a highly reflective target has not been aimed at and the second laser with high pulse power can be triggered safely. The use of the first laser with low pulse power thus effectively prevents highly reflective targets from being targeted by the laser with high pulse power and the receiver from being damaged. Effective protection of the receiver is thereby guaranteed. A protective filter with corresponding limitations, such as is known from the prior art, can thereby be omitted. Moreover, no comparison calculations with limit values of radiation intensity have to be carried out. In addition, the highly advantageous synergy effect results, whereby on detection of a target with the first laser pulse of low energy, in that the distance can be determined and thus the second laser with high pulse power no longer has to be ignited. In the present case, the pulse power is used for more detailed characterization of the laser light source. However, with the necessary changes the output pulse energy could also be used.

The second pulse power of the second laser light source can be higher than the first pulse power of the first laser light source by a factor of greater than or equal to 100. The first laser light source can be a semiconductor laser, in particular a diode laser. The first laser light source can comprise a pulse power that lies in a range from about 1 W to about 10 kW, in particular between about 3 W and about 5 W.

It is advantageous if the first pulse power or pulse energy of the first laser light source is selected so that radiation reflected back from especially highly reflective targets (retroreflectors) at short distances does not cause damage to the receiver.

The second laser light source can be a giant pulse laser, in particular a solid-state laser. Long ranges of several kilometers can be achieved with the laser distance measuring device by this measure.

The second laser light source can comprise a pulse power that lies in a range from about 0.1 MW to about 10 MW. This enables targets at greater distances to be detected.

The second pulse power or pulse energy of the second laser light source can be selected so that the distance of targets at long distances, in particular of several kilometers, preferably greater than or equal to 20 km, can be determined.

It is advantageous if the electronic controller is designed to emit the second laser pulse at a time interval of about 100 μs to about 1 ms, in particular of about 150 μs after the first laser pulse. The time interval between the emission of the first laser pulse and the emission of the second laser pulse is accordingly selected so that movements of the observer or of the target in said time span can almost be excluded.

It is advantageous if the first laser light source and the second laser light source are designed to emit laser radiation at least approximately at the same wavelengths, in particular within a tolerance range preferably of about less than or equal to 20 nm.

The wavelengths of both lasers can be similar, so that the receiver can detect the radiation of both lasers. So-called eye safe wavelengths from 1400 nm, preferably between 1500 and 1600 nm, can also be used.

According to the invention, the laser distance measuring device can comprise a common transmitter beam path for the first laser light source and the second laser light source. This enables both lasers to use the same lens system when emitting the laser pulses.

The laser radiation output by the first laser light source or the laser radiation output by the second laser light source can be coupled into the common transmitter beam path. For example, the beam of the first laser light source, in particular of the diode laser, can be overlaid by the beam path of the second laser light source, in particular of the giant pulse laser, so that both lasers use the same transmitter beam path. Alternatively, of course the beam of the second laser light source, in particular of the giant pulse laser, can be overlaid by the beam path of the first laser light source, in particular of the diode laser. By these measures, only one lens system is necessary for both lasers. Both laser light sources thus use a common exit pupil. This enables costs and installation space to be saved.

The laser radiation output by the first laser light source or the laser radiation output by the second laser light source can be coupled into the common transmitter beam path by means of a mirror that is partially transmissive or a mirror that comprises a recess or by means of a polarizer.

The coupling in or overlaying can for example be carried out by means of a partially transmissive or semi-transparent mirror or a mirror comprising a recess (so-called area sharing), but also with other beam combiners or by means of suitable polarization.

It is advantageous if the receiver is designed for receiving reflected laser radiation of both the first laser light source as well as the second laser light source. Therefore, a common receiver can be used for both lasers.

In accordance with another aspect, a method is specified for operating a laser distance measuring device for determining a distance to a target, in particular for a weapon system, with which the distance measurement is carried out with the emission of a first laser pulse or of a second laser pulse, a first laser pulse is emitted with a first pulse power, and a second laser pulse is emitted with a second pulse power only if a distance to the target could not be determined by means of the first laser pulse, wherein the second pulse power of the second laser pulse is higher than the first pulse power of the first laser pulse, in particular by a factor of greater than or equal to 100.

FIG. 1 shows a laser distance measuring device 1 according to the invention for determining a distance to a target, in particular for a weapon system that is not shown, comprising a first laser light source TX1 that is designed to emit laser pulses P1 with a first pulse power, a second laser light source TX2 that is designed to emit laser pulses P2 with a second pulse power, wherein the second pulse power of the second laser light source TX2 is higher than the first pulse power of the first laser light source TX1, a receiver 2 that is designed to receive laser pulse radiation RP reflected by the target, an analysis circuit or an electronic controller 3 for actuating the first laser light source TX1, the second laser light source TX2 and the receiver 2, wherein for determining the distance to the target, the electronic controller 3 is configured to emit a first laser pulse P1 by means of the first laser light source TX1, after which, if a distance to the target cannot be determined with the first laser pulse P1 by means of the receiver 2, a second laser pulse P2 is emitted by means of the second laser light source TX2.

In the present exemplary embodiment, the first laser light source TX1 is implemented as a semiconductor laser, in particular a diode laser. The second laser light source TX2 is implemented as a giant pulse laser, in particular a solid-state laser.

The second pulse power of the second laser light source TX2 can be higher than the first pulse power of the first laser light source TX1 by a factor of greater than or equal to 100. The first laser light source TX1 can comprise a pulse power that lies in a range from about 1 W to about 10 kW, in particular between about 3 W and about 5 W.

In some embodiments, the first pulse power of the first laser light source TX1 is selected so that radiation reflected back from reflective or highly reflective targets at a short distance does not lead to damage to the receiver 2.

The second laser light source TX2 can comprise a pulse power that lies in a range from about 0.1 MW to about 10 MW.

The second pulse power of the second laser light source TX2 can be selected so that the distance of targets at great distances, in particular of several kilometers, preferably greater than or equal to 20 km, can be determined.

As shown in FIG. 1, the electronic controller 3 comprises a laser trigger unit 3a and a time delay unit 3b. The laser trigger unit 3a controls the emission of the laser pulses P1, P2 of the laser light sources TX1, TX2. The electronic controller 3 is designed to emit the second laser pulse P2 at a time interval of about 100 μs to about 1 ms, in particular of about 150 μs, after the first laser pulse P1. The laser trigger unit 3a controls the laser light sources TX1, TX2 for this by means of the time delay unit 3b, which produces the time interval or the time delay.

The first laser light source TX1 and the second laser light source TX2 are designed to emit laser radiation at least approximately at the same wavelengths, in particular within a tolerance range, preferably of about less than or equal to 20 nm. The wavelengths can move within a range of greater than 1400 nm, in particular of 1500 to 1600 nm.

The laser distance measuring device 1 according to the invention further comprises a common transmitter beam path 4 for the first laser light source TX1 and the second laser light source TX2. As a result, the laser light sources TX1, TX2 can use the same lens system or a common transmitter objective 4a of the transmitter beam path 4.

The laser radiation output by the first laser light source TX1 or the laser radiation output by the second laser light source TX2 can be coupled into the common transmitter beam path 4. In the present exemplary embodiment, the laser radiation output by the second laser light source TX2 is coupled into the common transmitter beam path 4 by means of a partially transmissive mirror 4b. In further exemplary embodiments that are not shown, the laser radiation output by the first laser light source TX1 could also be coupled into the common transmitter beam path 4 or be overlaid thereon. In further exemplary embodiments that are not shown, other optical elements could also be provided for combining or overlaying beams, for example a mirror with a recess or a polarizer.

The receiver 2 is designed for receiving reflected laser radiation RP both of the first laser light source TX1 as well as of the second laser light source TX2.

With the laser distance measuring device 1, a method can be implemented for operating the laser distance measuring device 1 for determining a distance to a target, in particular for a weapon system, with which the distance measurement is carried out with the emission of a first laser pulse P1 or of a second laser pulse P2, a first laser pulse P1 with a first pulse power is emitted, and a second laser pulse P2 with a second pulse power is only then emitted if a distance to the target could not be determined by means of the first laser pulse P1, wherein the second pulse power of the second laser pulse P2 is higher than the first pulse power of the first laser pulse P1, in particular by a factor of greater than or equal to 100.

REFERENCE CHARACTER LIST 1 laser distance measuring device
2 receiver
3 electronic controller
3a laser trigger unit
3b time delay unit
4 transmitter beam path
4a transmitter objective
4b partially transmissive mirror
TX1 first laser light source
TX2 second laser light source
P1 laser pulse with first pulse power
P2 laser pulse with second pulse power
RP reflected laser pulse radiation

The invention claimed is:

1. A laser distance measuring device for determining a distance to a target, in particular for a weapon system, comprising a common transmitter beam path for a first laser light source and a second laser light source, and further comprising:
   the first laser light source adapted to emit laser pulses with a first pulse power;
   the second laser light source adapted to emit laser pulses with a second pulse power, wherein the second pulse power of the second laser light source is higher than the first pulse power of the first laser light source;
   a receiver adapted to receive laser pulse radiation reflected by the target;
   an electronic controller that controls at least one of the first laser light source, the second laser light source and the receiver;
   wherein to determine the distance to the target, the electronic controller emits a first laser pulse via the first laser light source, after which, if a distance to the target cannot be determined with the first laser pulse by means of the receiver, a second laser pulse is emitted via the second laser light source.

2. The laser distance measuring device according to claim 1, wherein the second pulse power of the second laser light source is higher than the first pulse power of the first laser light source by a factor of greater than or equal to 100.

3. The laser distance measuring device according to claim 1, wherein the first laser light source is a semiconductor diode laser.

4. The laser distance measuring device according to claim 1, wherein the first laser light source comprises a pulse power that lies in a range from about 1 W to about 10 kW, in particular between about 3 W and about 5 W.

5. The laser distance measuring device according to claim 1, wherein the first laser light source comprises a pulse power that lies in a range from about 3 W and about 5 W.

6. The laser distance measuring device according to claim 1, wherein the first pulse power of the first laser light source is selected so that radiation reflected back from reflective targets at short distances does not lead to damage to the receiver.

7. The laser distance measuring device according to claim 1, wherein the second laser light source is a giant pulse solid state laser.

8. The laser distance measuring device according to claim 1, wherein the second laser light source comprises a pulse power that lies in a range from about 0.1 MW to about 10 MW.

9. The laser distance measuring device according to claim 1, wherein the second pulse power of the second laser light source is selected so that the distance of targets at distances greater than or equal to 10 km, can be determined.

10. The laser distance measuring device according to claim 1, wherein the electronic controller is configured to emit the second laser pulse at a time interval of about 100 μs to about 1 ms, after the first laser pulse.

11. The laser distance measuring device according to claim 1, wherein the first laser light source and the second laser light source are designed to emit laser radiation at least approximately at the same wavelengths, in particular within a tolerance range, preferably of about less than or equal to 20 nm.

12. The laser distance measuring device according to claim 1, wherein the laser radiation output by the first laser light source or the laser radiation output by the second laser light source is coupled into the common transmitter beam path.

13. The laser distance measuring device according to claim 1, wherein the laser radiation output by the first laser light source or the laser radiation output by the second laser light source is coupled into the common transmitter beam path by means of a partially transmissive mirror or a mirror comprising a recess or by means of a polarizer.

14. The laser distance measuring device according to claim 1, wherein the receiver is designed for receiving reflected laser radiation from both of the first laser light source and of the second laser light source.

15. A method for operating a laser distance measuring device for determining a distance to a target, in particular for a weapon system, wherein the laser distance measuring device comprises a common transmitter beam path for a first laser light source and a second laser light source, the method comprising:
 emitting, via the first laser light source, a first laser pulse with a first pulse power; and
 emitting, via the second laser light source, a second laser pulse with a second pulse power only if a distance to the target cannot be determined by means of the first laser pulse,
 wherein the second pulse power of the second laser pulse is higher than the first pulse power of the first laser pulse by a factor of greater than or equal to 100.

* * * * *